US012429023B1

(12) United States Patent
Everett, Jr.

(10) Patent No.: US 12,429,023 B1
(45) Date of Patent: Sep. 30, 2025

(54) HYDROPOWER PLANT WITH OFFSHORE WATER SUPPLY

(71) Applicant: Wilson Earlie Everett, Jr., Ellenwood, GA (US)

(72) Inventor: Wilson Earlie Everett, Jr., Ellenwood, GA (US)

(*) Notice: Subject to any disclaimer, the term of this patent is extended or adjusted under 35 U.S.C. 154(b) by 0 days.

(21) Appl. No.: 18/825,232

(22) Filed: Sep. 5, 2024

(51) Int. Cl.
*F03B 13/08* (2006.01)
*F03B 15/02* (2006.01)

(52) U.S. Cl.
CPC .............. *F03B 13/08* (2013.01); *F03B 15/02* (2013.01)

(58) Field of Classification Search
CPC ........... Y02E 10/20; F03B 15/02; F03B 13/08
See application file for complete search history.

(56) References Cited

U.S. PATENT DOCUMENTS 4,091,618 A 5/1978 Jackson
4,092,828 A 6/1978 Garza
5,440,176 A 8/1995 Haining
7,281,371 B1 * 10/2007 Heidenreich ........... F03B 13/06 60/398
7,339,285 B2 3/2008 Negron Crespo
8,093,743 B2 1/2012 Bozano
8,511,078 B2 8/2013 Da Costa
8,698,338 B2 4/2014 Slocum et al.
9,127,639 B2 9/2015 Cho et al.
11,608,808 B2 3/2023 Braverman et al.
11,840,815 B2 12/2023 Migdal et al.
2007/0292259 A1 12/2007 Choie
2008/0023963 A1 * 1/2008 Perich ....................... C02F 1/04 202/185.1
2009/0206609 A1 8/2009 Wood
2012/0286508 A1 11/2012 Poddey
2013/0009401 A1 1/2013 Biteryakov
2014/0028028 A1 1/2014 Frye
2017/0045026 A1 2/2017 Fang et al.
2017/0110883 A1 4/2017 Tabe
2018/0066627 A1 3/2018 Perez Ramos

FOREIGN PATENT DOCUMENTS

CA 2801045 A1 * 6/2013 ............... E02B 9/06

* cited by examiner

*Primary Examiner* — Abiy Teka
(74) *Attorney, Agent, or Firm* — Dunlap Bennett & Ludwig, PLLC; Anna L. Kinney

(57) ABSTRACT

A hydropower plant with offshore water supply includes at least one water intake structure, underground penstock, turbine, and tailrace. The water intake structure has a base built on a continental shelf of a water body and a water intake at an elevation above the base. The penstock has an inlet connected to the base and an outlet. The turbine is mounted on a turbine machine floor in an underground turbine room at an elevation lower than the base. The turbine has an inlet port connected to the penstock outlet and an outlet port connected to the tailrace. The inlet receives fluid from the water intake; the inlet port receives fluid from the outlet of the penstock; and the tailrace receives fluid from the inlet port and conveys the fluid to the water body.

3 Claims, 2 Drawing Sheets

HYDROPOWER PLANT WITH OFFSHORE WATER SUPPLY

BACKGROUND OF THE INVENTION

The present invention relates to energy production by hydropower and, more particularly, to a hydropower plant with an offshore water supply.

Current hydropower plants (impoundment, diversion, pumped storage) are dependent on a disruptable water supply. For example, river supplied water relies on precipitation (rainfall and snowfall), which is subject to droughts, and stored water supplies are vulnerable to overuse by diversions to agriculture and downstream city and habitat requirements.

As can be seen, there is a need for a hydropower plant having a water supply that is not disruptable by variations in precipitation and water use.

SUMMARY OF THE INVENTION

In one aspect of the present invention, a hydropower plant with offshore water supply comprises at least one water intake structure (10) having a base built on a continental shelf (24) of a water body and having a water intake at an elevation above the base; at least one underground penstock (12) having an inlet and an outlet, wherein the intake is coupled to the base of the at least one water intake structure (10); at least one turbine (16), mounted on a turbine machine floor (34) in an underground turbine room (14) having an elevation lower than the base, the at least one turbine (16) having an inlet port coupled to the outlet of the at least one underground penstock (12) and an outlet port; and a tailrace (28) coupled to the outlet port. The inlet fluidly communicates with the water intake; the inlet port fluidly communicates with the outlet of the at least one underground penstock (12); the tailrace (28) fluidly communicates with the inlet port; and the tailrace (28) is operative to convey fluid from the outlet port to the water body.

The hydropower plant disclosed herein has an uninterruptible water supply. The water supply has offshore water intake towers connected to underground penstocks, turbines, and a tailrace. The offshore intake eliminates the need for dams for impoundment, diversions, and pumped storage water supplies. The plant does not rely on precipitation; it relies only on the ocean as the unlimited water supply.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a hydropower plant with offshore water supply for power generation around the world. It does not produce greenhouse gases, dramatically reducing the environmental impact of energy production.

The hydropower plant of the present subject matter may be located anywhere having a water supply with a level that is not significantly affected by changes in precipitation, such as an ocean or other large water body, e.g., Lake Mead. The plant may be manufactured and installed using well-known boring and mining methods.

Figure 1:
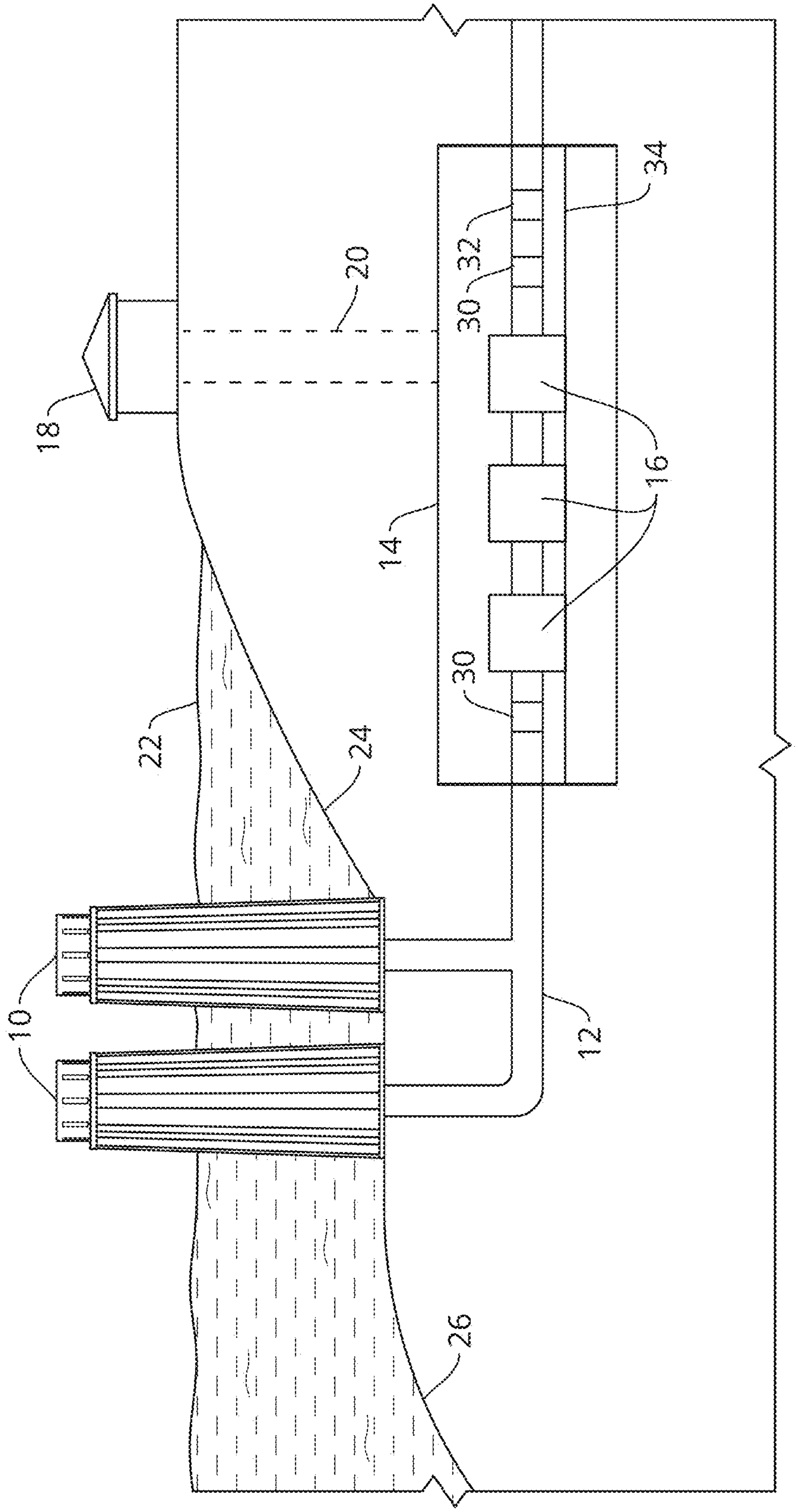
FIG. 1 is a schematic side view of a hydropower system according to an embodiment of the present invention.
Figure 2:
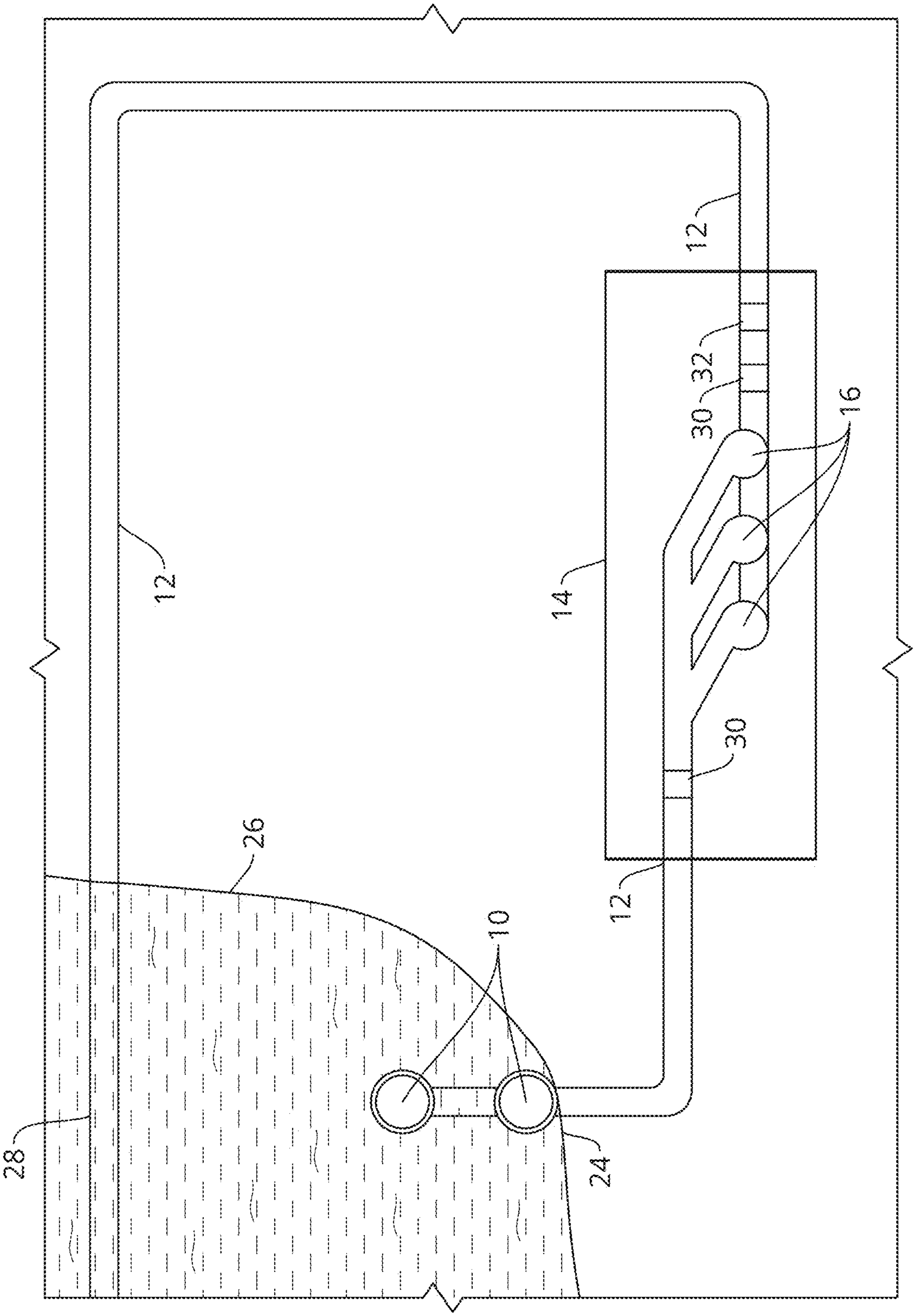
FIG. 2 is a continuation thereof.

Referring to FIGS. 1-2, an offshore hydropower plant is illustrated. The plant comprises water intake structures 10 similar to concrete intake structures/towers observable at Lake Mead, rising from the continental shelf 24, that take in water near ocean level 22 and route the water into reinforced, underground penstocks 12. The penstocks 12 feed turbines 16 in an underground turbine room 14 having a turbine machine floor 34. As such, the turbines 16 have a continuous flow of water that is not affected, or is only marginally affected, by changes in precipitation and water usage. The water drives the turbines 16, producing electricity that is collected via an existing electric grid and/or via a storage device (not shown). The penstocks 12 and a tailrace 28 exiting the turbine room 14 have cutoff valves 30, enabling an operator to control inflow and outflow through the turbines 16. The tailrace 28 is also supplied with a backflow preventer valve 32 to prevent water from reversing through the turbines 16. The turbine room 14 may be accessed from a control room/visitors' center/employee entrance 18 via an access/construction tunnel/elevator 20. The tailrace 28 extends into the soil of the continental shelf 24, returning to the ocean up slope 26 above and beyond the initial intake structures 10. Alternatively, the tailrace 28 may deliver the outflow to a pump storage system or reservoir.

It should be understood, of course, that the foregoing relates to exemplary embodiments of the invention and that modifications may be made without departing from the spirit and scope of the invention as set forth in the following claims.

What is claimed is:

1. A hydropower plant with offshore water supply, comprising:

at least one water intake structure (10) having a base built on a continental shelf (24) of a water body and having a water intake at an elevation above the base;

at least one underground penstock (12) having an inlet and an outlet, wherein the inlet is coupled to the base of the at least one water intake structure (10);

at least one turbine (16), mounted on a turbine machine floor (34) in an underground turbine room (14) having an elevation lower than the base, the at least one turbine (16) having an inlet port coupled to the outlet of the at least one underground penstock (12) and an outlet port; and a tailrace (28) coupled to the outlet port;

wherein the inlet fluidly communicates with the water intake; the inlet port fluidly communicates with the outlet of the at least one underground penstock (12); the tailrace (28) fluidly communicates with the inlet port; and the tailrace (28) is operative to convey fluid from the outlet port to the water body; and wherein a first cutoff valve (30) is mounted in the at least one underground penstock (12) and a second cutoff valve (3) is mounted within the tailrace (28).

2. A hydropower plant with offshore water supply, comprising:

at least one water intake structure (10) having a base built on a continental shelf (24) of a water body and having a water intake at an elevation above the base;

at least one underground penstock (12) having an inlet and an outlet, wherein the inlet is coupled to the base of the at least one water intake structure (10);

at least one turbine (16), mounted on a turbine machine floor (34) in an underground turbine room (14) having an elevation lower than the base, the at least one turbine (16) having an inlet port coupled to the outlet of the at least one underground penstock (12) and an outlet port; and a tailrace (28) coupled to the outlet port;

wherein the inlet fluidly communicates with the water intake; the inlet port fluidly communicates with the outlet of the at least one underground penstock (12);

the tailrace (28) fluidly communicates with the inlet port; and the tailrace (28) is operative to convey fluid from the outlet port to the water body;

wherein the tailrace (28) further comprises a backflow preventer valve (32).

3. A hydropower plant with offshore water supply, comprising:

at least one water intake structure (10) having a base built on a continental shelf (24) of a water body and having a water intake at an elevation above the base;

at least one underground penstock (12) having an inlet and an outlet, wherein the inlet is coupled to the base of the at least one water intake structure (10);

at least one turbine (16), mounted on a turbine machine floor (34) in an underground turbine room (14) having an elevation lower than the base, the at least one turbine (16) having an inlet port coupled to the outlet of the at least one underground penstock (12) and an outlet port; and a tailrace (28) coupled to the outlet port;

wherein the inlet fluidly communicates with the water intake; the inlet port fluidly communicates with the outlet of the at least one underground penstock (12);

the tailrace (28) fluidly communicates with the inlet port; and the tailrace (28) is operative to convey fluid from the outlet port to the water body; and further comprising an onshore entrance structure (18) coupled to the turbine room (14) via an access way (20).

* * * * *